June 8, 1965 R. G. HUSOME ETAL 3,187,973

FUSION APPARATUS

Filed Nov. 30, 1960

ROBERT G. HUSOME,
HENRY TRIGGER,
INVENTORS.

BY THEIR ATTORNEYS.

Spensley & Horn.

United States Patent Office 3,187,973

Patented June 8, 1965

3,187,973

FUSION APPARATUS

Robert Glenn Husome, Manhattan Beach, and Henry Trigger, Monterey Park, Calif., assignors to TRW Semiconductors, Inc., Lawndale, Calif., a corporation of Delaware Filed Nov. 30, 1960, Ser. No. 72,774
2 Claims. (Cl. 228—42)

This invention relates to semiconductor devices and more particularly to a method and apparatus for fusing a metallic foil in large area low resistance contact to the surface of a body of semiconductor material.

It has long ben desirable in the semiconductor art to make contact to semiconductor devices in a manner which is advantageous thermally, electrically and mechanically in order to produce devices which are capable of relatively high power dissipation. In the production of devices capable of high power dissipation it has been found that device efficiency hinges materially upon the thermal and electrical resistance of the contact. It has therefore been found necessary to produce an electrical contact over a broad area of the semiconductive body, which contact combines good mechanical strength with a thermal resistance of the order of one tenth of a degree centigrade per watt. It has also been desired to produce a contact of the character described which is resistant to etchants typically used in the semiconductor industry, such as one consisting of a combination of acids.

Materials which have been found to be inherently capable of producing a low resistance ohmic contact include base metals such as tin, copper, and cadmium, and noble metals such as gold, silver, platinum and rhodium. The method of the present invention has been found to be particularly successful in producing an electrical contact using gold, although it is not necessarily intended to be limited thereto. Prior art methods for depositing a layer of gold onto the sudface of a semiconductive body such as silicon, for example, have included evaporative plating, chemiplating, electroplating "local" contacts, and fusion.

Evaporative plating involves certain disadvantages for the purposes herein stated, in that it requires expensive equipment and presents difficulty in producing uniform layers especially layers having a controlled average thickness. Chemiplating in the past, has for the purposes herein mentioned, proved to be unsatisfactory in that the layers produced have typically been too thin. Electroplating using local contacts produces uneven plating due to the fact that the local contacts, when coupled with the relatively poor conductivity of semiconductor material, result in a non-uniform current density across the plated surface. Finally, large area contacts produced by prior art fusion methods have generally proven unsatisfactory because of the lack of uniformity in the depth of penetration of the gold into the silicon across the contact area.

It is therefore an object of the present invention to provide an improved method and apparatus for producing a conducting metal layer of uniform thickness over a predetermined portion of a surface of a body of semiconductor material.

It is another object of the present invention to provide an improved method and apparatus for producing a low resistance broad area etch resistant contact over a predetermined portion of the surface of a semiconductor body.

It is another object of the present invention to provide a method and apparatus for producing a uniform large area gold contact over a predetermined portion of the surface of a semiconductor body.

It is a further object of the present invention to produce a uniform large area gold contact to the surface of a silicon body.

It is a still further object of the present invention to provide apparatus for uniformly heating a surface of a semiconductive body.

It is another object of the present invention to provide apparatus for fusing a layer of gold foil to a surface of a body of semiconductive material, in which apparatus there is no significant temperature gradient.

It is yet another object of the present invention to provide apparatus for heating semiconductive bodies at a high rate of temperature rise.

It is still another object of the present invention to provide apparatus for simultaneously uniformly heating a plurality of semiconductor bodies at a high rate of temperature rise.

It is a further object of the present invention to provide apparatus for simultaneously producing identical uniform large area gold contacts on the surfaces of a plurality of semiconductor bodies.

It is a still further object of the present invention to provide apparatus suitable for production line use to produce low resistance contacts to surfaces of semiconductor bodies.

The objects of the present invention are accomplished by placing the thin metallic foil in assemblage with the semiconductor body, the foil being held against the semiconductor surface with the constant predetermined pressure exerted by a magnetic force, and rapidly heating the semiconductor-foil assemblage in a preheated reducing atmosphere to fuse the foil to the semiconductor surface. The disclosed apparatus for performing the method of the present invention is particularly suitable for production line use since identical junctions can be simultaneously produced in a plurality of semiconductor bodies because of the extremely uniform distribution of heat, uniform rapid heat rise, and constant uniform bonding pressure for each assemblage. The disclosed apparatus consists of magnetic means for holding the metallic foil in assemblage with the semiconductor body, a heat conductive heating plate upon which the assemblages are disposed, housing means defining a gas tight enclosure about the heating plate, and means for passing a preheated reducing atmosphere through the enclosure.

The novel features which are believed to be characteristic of the present invention, both as to its organization and method of operation, together with further objects and advantages thereof, will be better understood from their following description considered in connection with the accompanying drawing. It is to be expressly understood, however, that the drawing is for the purpose of illustration and example only, and it is not intended as a definition of the limits of the invention.

Figure 1:
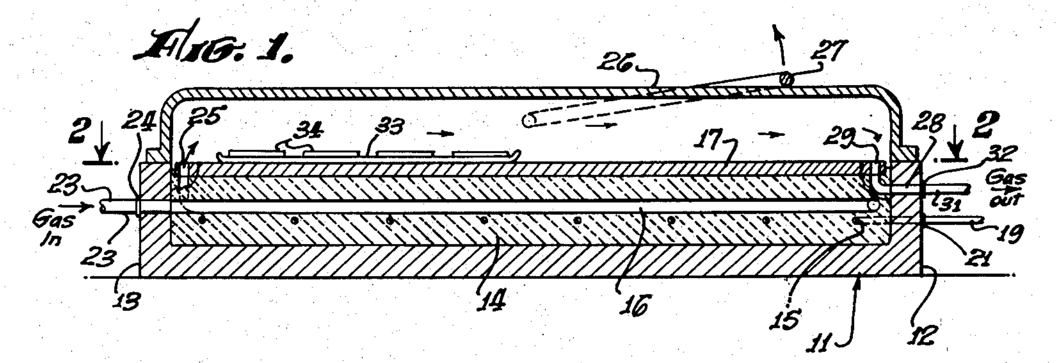
FIGURE 1 shows an elevational view in cross-section of the apparatus of the present invention.
Figure 2:
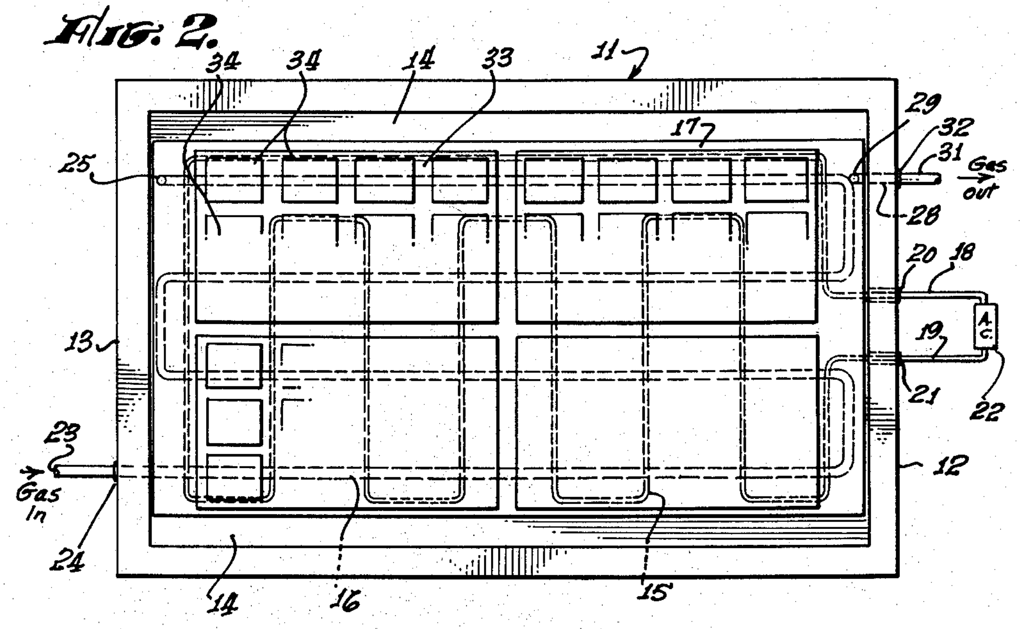
FIGURE 2 shows a partial plan view taken along the line 2—2 of FIGURE 1.

Referring now to FIGURES 1 and 2 of the drawing, there is illustrated a presently preferred embodiment of the apparatus in accordance with the present invention. The embodiment is illustrated as being used to fuse gold foil wafers to silicon semiconductor bodies. The base of the apparatus is a shallow rectangular box 11 of cast aluminum, having end walls 12 and 13. Disposed within the box 11 and supportably surrounded by refractory material 14, are an electrical heating element 15 and a hollow tube 16. A rectangular aluminum plate 17 is positioned atop the refractory material 14 and partially countersunk therein as shown, the rim of refractory material around the plate 17 providing thermal insulation between the plate 17 and the box 11.

The heating element 15 is of heavy metallic construction capable of dissipating a relatively large amount of electrical power as heat, the serpentine shape of the element 15 insuring even heat distribution. Straight end portions 18 and 19 of the sinuous electrical heating element 15, extend through the end wall 12 of the box 11 through air-tight insulating seals 20 and 21 respectively. The end portions 18 and 19 of the heating element 15 are adapted for connection to a source of alternating current electricity indicated generally by the reference numeral 22.

One end 23 of the hollow tube 16 extends through the end wall 13 of the box 11 through an air-tight seal 24. The other end 25 of the hollow tube 16 vertically terminates within a hole extending through the plate 17. The end 23 of the hollow tube 16 is adapted for connection to a source of gas pressure, not shown. The sinuous configuration of the tube 16 through the refractory material 14 in the box 11 in proximity to the electrical heating element 15 provides preheating of the gas passing through the tube before its emission from the tube end 25.

A Pyrex glass cover dish 26 is removably fitted to the upper surfaces of the walls of the box 11, the mating surfaces being perfectly flat and smooth to thereby form a gas-tight seal. A bail 27 is pivotably mounted to the exterior side walls of the glass cover 26 to facilitate handling of the cover while it is hot. With the glass cover 26 in position on the box 11 (as shown in FIGURE 1), a gas-tight enclosure is formed therebetween. An exhaust outlet in the form of a hollow tube 28 is provided for removal of spent atmosphere. The tube 28 has a vertical end portion 29 protruding into a hole extending through the plate 17. The other end 31 of the tube 28 extends through the end wall 12 of the box 11 through a gas-tight seal 32. The end 31 of the tube 28 is adapted for connection to an exhaust stack, not shown, wherein the spent atmosphere is burned.

Four thin aluminum trays 33 are provided for disposition on the plate 17 within the box 11. Welded to the upper surface of each aluminum tray 33 are a series of a thin rectangular steel blocks 34, twelve of such blocks per tray being shown in the illustrated embodiment. Upon each of the steel blocks 34 can be positioned a semiconductor device to which a contact is to be fused.

Figure 3:
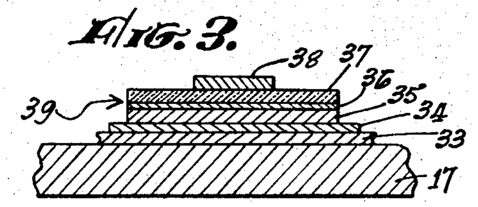
FIGURE 3 shows a partial cross-sectional view in elevation of a semiconductor assembly in position in the apparatus of the present invention.

Referring now to FIGURE 3, a portion of a tray 33 including one of the steel blocks 34 is shown in cross-section. Assembled on the steel block 34 is a multi-layer assemblage consisting of a silicon wafer 35, a sheet of gold foil 36, a glass disc 37, and a rectangular bar magnet 38. The assemblage is indicated generally by the reference numeral 39. The gold foil 36 may be doped with active impurity to thereby produce an extremely low resistance junction upon bonding to the semiconductor surface. The force of magnetic attraction between the magnet 38 and the steel block 34 maintains the semiconductor assemblage 39 in the desired relationship, the magnetic force together with the weight of the magnet 38 providing the desired pressure. Each aluminum tray 33 is loaded with twelve such asemblages, one semiconductor wafer assembly being placed upon each of the steel blocks 34. Each of the bar magnets 38 is aligned perpendicularly to the immediate neighboring magnets on the tray, as shown, to prevent magnetic interaction between adjacent magnets. The loaded trays 33 are then placed in position upon the plate 17 within the box 11, the glass cover 26 placed into position and a reducing atmosphere of gas is passed through the tube 16 to thereby purge the chamber defined between the box 11 and the glass cover 26. The exhaust stack is ignited and after a suitable purge interval electrical energy is applied to the heating element 15 from the A.C. electrical source 22. When the desired fusion temperature is reached, the temperature is there maintained by control of the electrical current passing through the heating element 15 in a manner well known to the art. Upon fusion of the gold foil 36 to the silicon wafer 35 the source of electrical energy 22 is disconnected from the heating element 15, the gas pressure turned off, and the apparatus allowed to cool.

The electrical heating element 15 provides the necessary high wattage density and even heat distribution. Use of the aluminum plate 17 provides a smooth surface of high thermal conductivity so that all points on the surface are at a uniform temperature. Therefore the temperature of the load (the aluminum trays 33 and the assemblages 39) closely approximate the temperature of the aluminum plate 17, due to the intimate contact therebetween. Hence, each of the forty eight semiconductor assemblages reach essentially the same temperature, i.e., the temperature of the aluminum plate 17. Therefore, monitoring of the temperature of the aluminum plate 17 enables the operator to continually check the temperature of the semiconductor assemblages. Visual monitoring is also provided by the transparent glass cover 26.

Providing each semiconductor wafer assemblage with its own bar magnet 38 insures uniform and identical pressures upon each semiconductor assemblage. The pressure is relatively independent of the thickness of the silicon wafers, the gold foil, and the glass wafers. Since the pressure is independent for each semiconductor assemblage the constant pressure is maintained upon each assemblage upon expansion and contraction due to temperature gradients. Temperature gradients due to gas flow are almost non-existent because the gas is preheated before entering the fusion chamber. Furthermore, due to the high wattage density of the heating element 15 and the even distribution of heat, all points on all silicon wafers pass through the eutectic temperature at approximately the same time. Thus, alloying between the silicon and gold takes place at essentially the same time on all silicon-gold interphases, thereby resulting in a more uniform depth of penetration.

In summary, the novel apparatus of the present invention provides the necessary strict control of temperature, pressure, and atmosphere necesasry to achieve uniform results in mass production. All semiconductor wafers are subjected to the same temperature cycle, the temperature cycle providing a fast rate of rise through the eutectic temperature. The desired temperature cycle could alternatively be accomplished through the use of individual heaters and controllers sensing work temperature, or by a careful control of power input and heat losses to each semiconductor assemblage. In the present invention all parts are subjected to uniform and equal pressure throughout the temperature cycle through the identical magnetic forces of individual bar magnets. However, the desired uniform pressures could also be produced with springs or weights. Alloying takes place in a reducing atmosphere, maintained in the preferred embodiment by the gas-tight enclosure which prevents contamination by leakage, the materials of the enclosure and the enclosed parts being selected so they will not contaminate the atmosphere, and a continual exhaust of the spent atmosphere.

Thus, although the present invention has been described with a certain degree of particularity, it is understood that the present disclosure has been made only by way of example and that numerous changes in the details of construction and the combination and arrangement of the parts may be resorted to without departing from the spirit and scope of the invention as hereinafter claimed.

What is claimed is:

1. Apparatus for fusing a metallic foil to a surface of a body of semiconductor material comprising, in combination: a shallow receptacle of heat conductive material partially filled with a refractory material, said shallow receptacle having a top opening; heating means disposed within the refractory material in said shallow receptacle, said heating means being adapted for the even distribution of heat throughout said refractory material; gas conduit means disposed within the refractory material in said shallow receptacle in proximity to said heating means, said gas conduit means having an inlet extending through a gas-tight seal in a wall of said shallow receptacle and terminating without said receptacle, said gas conduit means having an outlet in communication with the space above the refractory material within said shallow receptacle near one end thereof; gas exhaust conduit means having an inlet in communication with the space above the refractory material within said shallow receptacle near the other end thereof and an outlet extending through a gas-tight seal in a wall of said receptacle and terminating without said receptacle; a heat conductive plate disposed atop the refractory material in spaced relationship from the walls of said shallow receptacle; heat resistant cover means detachably mounted to the top opening of said shallow receptacle in a gas-tight seal; and magnetic means for urging a metallic foil with a constant predetermined pressure against the surface of a body of semiconductor material disposed on said heat conductive plate.

2. Apparatus for fusing a metallic foil to a surface of a body of semiconductor material comprising, in combination: a shallow receptacle of heat conductive material partially filled with a refractory material, said shallow receptacle having a top opening; heating means disposed within the refractory material in said shallow receptacle, said heating means being adapted for even distribution of heat throughout said refractory material; gas conduit means disposed within the refractory material in said shallow receptacle in proximity to said heating means, said gas conduit means having an inlet extending through a gas-tight seal in a wall of said shallow receptacle and terminating without said receptacle, said gas conduit means having an outlet in communication with the space above the refractory material within said shallow receptacle near one end thereof; gas exhaust conduit means having an inlet in communication with the space above the refractory material within said shallow receptacle near the other end thereof and an outlet extending through a gas-tight seal in a wall of said receptacle and terminating without said receptacle; a heat conductive plate disposed atop the refractory material in spaced relationship from the walls of said shallow receptacle; heat resistant cover means detachably mounted to the top opening of said shallow receptacle in a gas-tight seal therewith; a thin, flat tray of heat conductive material disposed on said heat conductive plate and an intimate contact therewith, said tray having a block of ferromagnetic material affixed thereto adapted for the disposal thereon of said body of semiconductor material and said metallic foil; a sheet of glass for disposal atop the metallic foil; and a permanent magnet for disposal atop said sheet of glass to press said metallic foil against said body of semiconductor material with a constant predetermined pressure during the fusion operation.

References Cited by the Examiner

UNITED STATES PATENTS

| | | | |
|---|---|---|---|
| 1,253,487 | 1/18 | Harper | 219—393 |
| 2,303,555 | 12/42 | Humphrey | 29—473.1 XR |
| 2,614,516 | 10/52 | Soderman | 113—99 |
| 2,709,147 | 5/55 | Ziegler | 29—494 |
| 2,801,375 | 7/57 | Losco | 29—25.3 |
| 2,835,615 | 5/58 | Leingelder et al. | 29—494 XR |
| 2,862,470 | 12/58 | Williams | 113—99 XR |
| 2,960,419 | 11/60 | Emeis | 113—99 XR |
| 2,962,811 | 12/60 | Herbert | 29—494 XR |
| 2,991,347 | 7/61 | Weinstein | 113—99 XR |
| 2,996,800 | 8/61 | Holly | 29—494 |
| 3,071,854 | 1/63 | Pighini | 29—25.3 |

FOREIGN PATENTS 603,587 4/60 Italy.
(Corresponding to Australia No. 234,437, June 30, 1961)

CHARLES W. LANHAM, *Primary Examiner.*

WHITMORE A. WILTZ, JOHN P. CAMPBELL, *Examiners.*